Figure 1:
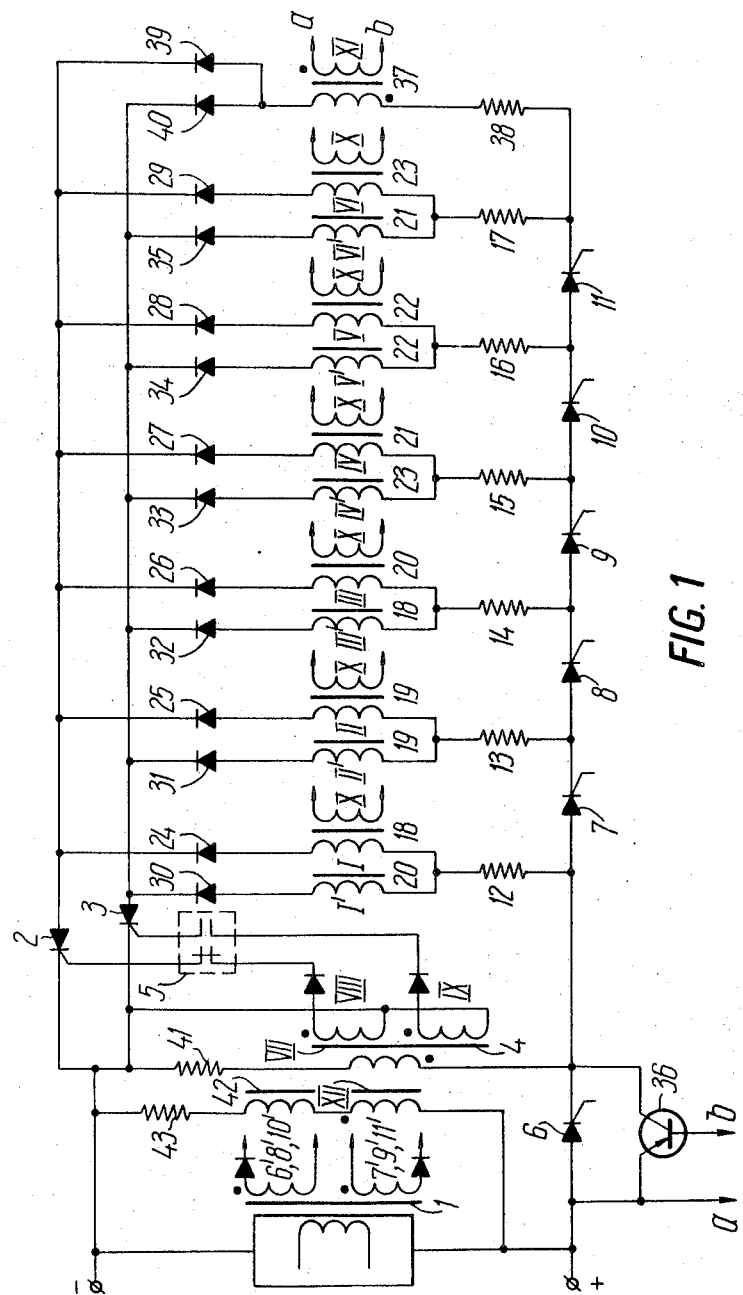

United States Patent [19]

Talov et al.

[11] 3,823,361

[45] July 9, 1974

[54] CONTROL DEVICE FOR A REVERSIBLE STATIC FREQUENCY CONVERTER

[76] Inventors: Vladislav Vasilievich Talov, ulitsa Jubileinaya, 11, kv. 107; Vladimir Grigorievich Yatsuk, ulitsa Pervomaiskaya, 8, kv. 57, all of Istra Moskovskoi oblasti, U.S.S.R.

[22] Filed: Sept. 25, 1972

[21] Appl. No.: 292,169

[52] U.S. Cl. .............................. 321/27 R, 321/69 R
[51] Int. Cl. ............................................ H02m 7/00
[58] Field of Search ................................ 321/69, 27

[56] References Cited
FOREIGN PATENTS OR APPLICATIONS
1,209,065   10/1970   Great Britain ................... 321/27 R

*Primary Examiner*—William M. Shoop, Jr.
*Attorney, Agent, or Firm*—Eric H. Waters

[57] ABSTRACT

A control device for a reversible static frequency converter comprising a DC power supply source and connected thereto, a master generator, a reversible unit with two key thyristors and a push-pull shift register consisting of separate cells each comprising a controlled semiconductor switch, and a thyristor for example, with one electrode connected to the direct and reverse count windings of output pulse transformers of two different cells, the other ends of said windings being connected to said key thyristors. The reversible unit, comprises a pulse transformer having its primary winding connected between the electrode of the semiconductor switch of the first cell of the shift register and the negative pole of a DC power supply source, the secondary windings being connected via commutation elements to a respective circuit controlling said two key thyristors.

1 Claim, 2 Drawing Figures

CONTROL DEVICE FOR A REVERSIBLE STATIC FREQUENCY CONVERTER

The present invention relates to power conversion equipment generally and more particularly to control devices for reversible static frequency convertors.

Known in the art are control devices for a reversible static frequency converter, comprising an AC power supply source and, connected thereto a master generator, a reversible unit with two key thyristors, and a push-pull shift register consisting of separate cells each comprising a controlled semiconductor switch having one of its electrodes connected through a resistor to a common point of the one ends of direct and reverse windings of output pulse transformers of two different cells while the other ends of said windings are connected via decoupling diodes to one of the electrodes of said key thyristors. Reference is made, for example, to a book by R.V.Bylik et al. "Pulse Networks Using Dynistors and Thyristors" Nauka Publishing House, Moscow, 1968.

The prior-art devices have the following disadvantages: first, the pulses operating the thyristors of such a device should be phased and synchronized with respect to the positive half-cycle of the supply voltage second, the operation of the reversible unit should be synchronized with an AC supply voltage; third, such a device will find a more efficient application as a control element for a reversible static frequency converter of stabilized frequency, as otherwise a need would arise to resort to an AC power supply source of stabilized frequency thus making the device itself more complex; fourth, interferences emerging from the output windings due to the non-rectangular magnetic characteristic of the material may result in switching on the thyristors of the device at the moment of termination of the reversal magnetization cycle of the transformer as the magnetic condition of the core changes back from $B_m$ (maximum negative induction) to $B_r$ negative remanence); fifth, in principle, no transformer made from a material with a non-rectangular hysteresis loop can be employed in the device.

A object of the present invention is to eliminate the above disadvantages of the existing control devices for a reversible static frequency converter and, hence, to increase their operational reliability.

This is achieved by a control device for a reversible static frequency converter comprising a power supply source and, connected thereto, a master generator, a reversible unit with two key thyristors and a push-pull shift register consisting of separate cells each comprising a controlled semiconductor switch having one of its electrodes connected via a resistor to a common point of ends of direct and reverse count windings of output pulse transformers of two different cells whereas the other ends of said windings are connected through decoupling diodes to one of the electrodes of said key thyristors, the reverse unit comprising, according to the invention, a pulse transformer with its primary winding connected between said electrode of the semiconductor switch of the first cell of the shift register and the negative pole of a DC power supply source and the secondary windings connected via commutation elements to a respective control circuit of said key.

Figure 2:
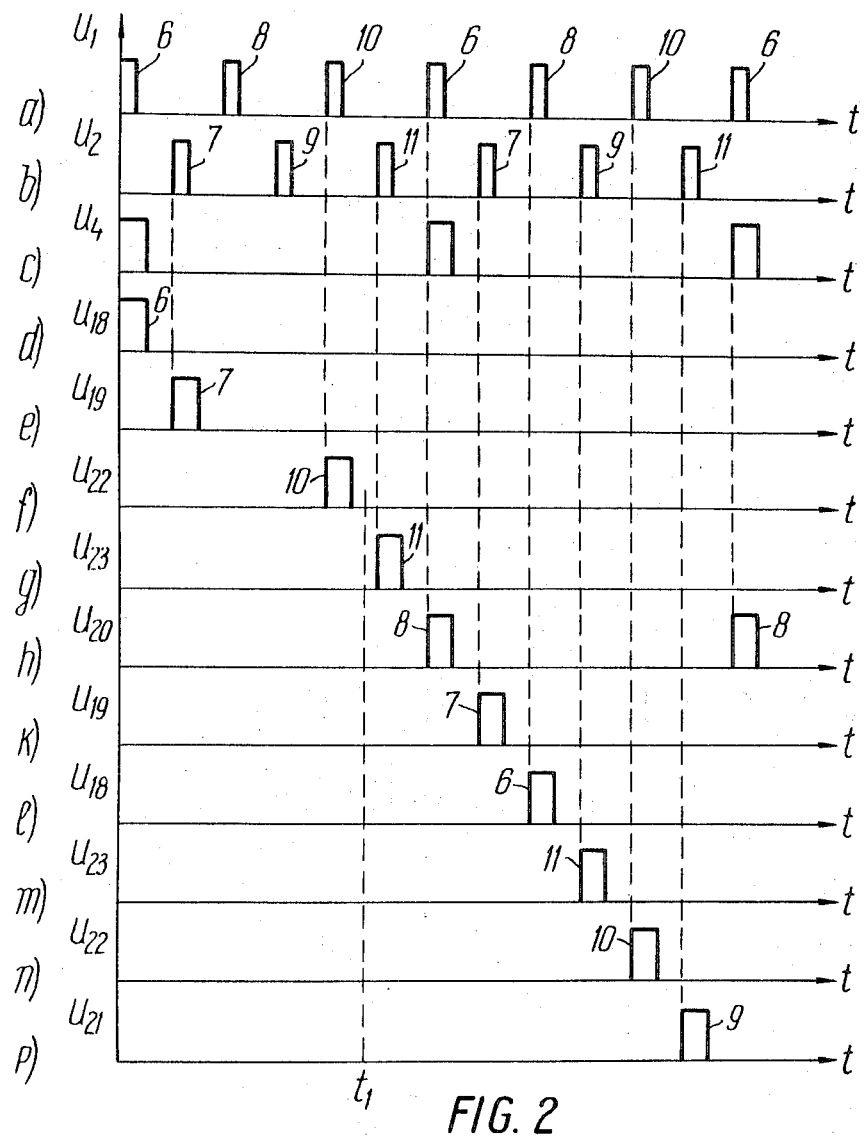

The invention will be better understood from the following detailed description taken in connection with the accompanying drawings, wherein:

FIG. 1 is a key diagram of a control device for a reversible static frequency converter according to the invention;

FIGS. 2 (a to p) constitute a pulse diagram of the device according to FIG. 1.

It should be born in mind that each term in the description extends to all the equivalent elements operating in a similar way and used to achieve the same objects as those disclosed herein.

As is clear from FIG. 1b, in a control device for a reversible static frequency converter, there are connected to the + and − terminals of a DC power supply source a master generator having an output transformer 1; a reversible unit having two key thyristors 2, 3 with the cathodes connected to the − terminal of the power supply source and comprising commutation elements 5 (defined on Page 99 IEEE Dictonary of Electrical and Electronics Terms, 1972) and a pulse transformer 4 controlling said two key thyristors 2, 3; a push-pull shift register composed of six separate cells comprising semiconductor switches, in particular, thyristors 6, 7, 8, 9, 10, 11 connected in series. As is well known, the cells in a shift register temporarily retain units of information for movement to another position (see also Page 79 IEEE Dictionary supra) The common points of the ends of direct I, II, III, IV, V, VI and reverse I′, II′, III′, IV′, V′, VI′ count windings of output transformers 18, 19, 20, 21, 22, 23 are connected to the cathodes of the thyristors 6, 7, 8, 9, 10, 11 of the shift register via respective ballast resistors 12, 13, 14, 15, 16, 17 the primary direct count windings I, II, III, IV, V, VI being connected through decoupling diodes 24, 25, 26, 27, 28, 29 to the anode of the key thyristor 2, while the primary count windings I′, II′, III′, IV′, V′, VI′ are connected via decoupling diodes 30, 31, 32, 33, 34, 35 to the anode of the key thyristor 3 A transistor 36 designed to bring the shift register to its initial position is connected in parallel to the thyristor 6 and controlled by a transformer 37 having its primary winding connected through a ballast resistor 38 to the cathode of the thyristor 11 on the one hand and through decoupling diodes 39, 40 to the anodes of the thyristors 2, 3 on the other. A primary winding VII of the pulse transformer 4 is connected between the cathode of the thyristor 6 (the first cell of the shift register) and the − terminal of the power supply source, secondary windings VIII, IX being connected through the commutation elements 5 to the control circuit of the key thyristors 2, 3. Windings 6′, 8′, 10′ and 7′, 9′, 11′ of the transformer 1 designed to control the thyristors 6, 7, 8, 9, 10, 11 of the shift register energize the thyristors 6, 8, 10 and 7, 9, 11 respectively by pulses $U_1$ and $U_2$ of the same polarity and shifted by 180° (FIGS. 2a, 2b) with respect to one another.

The phenomena at the instant of impressing a control pulse upon the shift register thyristor 6 of the control device for a reversible static frequency converter disclosed herein will next be considered. The thyristor 6 is energized and the transformer 4 of the reverse unit is connected to the power supply source via: the + terminal of the power supply source, the thyristor 6, the winding VII of the transformer 4, a resistor 41, the − terminal of the power supply source. A pulse $U_4$ (FIG. 2c) originating in the windings VIII, IX upon the reversal magnetization of the transformer 4 is applied, under the given condition of the commutation elements 5, to the key thyristor 2 and energizes it. As a result, the direct count windings I, II, III, IV, V, VI of the output transformers 18, 19, 20, 21, 22, 23 are connected through the decoupling diodes 24, 25, 26, 27, 28, 29 and the thyristor 2 to the − terminal of the power supply source. From this moment on, the thyristor 2 remains energized to the end of the working cycle of the shift registor. As soon as the thyristors 6, 2 are energized the winding I of the transformer 18 is connected to the power supply source via: the + terminal of the power supply source, the thyristor 6, the resistor 12, the winding 1 of the transformer 18, the diode 24, the thyristor 2, the − terminal of the power supply source. An output control pulse $U_{16}$ originates upon the reversal magnetization of the transformer 18 in its winding X (FIG. 2d).

In a similar way, when the thyristors 7, 8, 9, 10, 11 of the shift register are sequentially energized on, output control pulses $U_{19}$ to $_{23}$ originating in the windings X of the transformers $_{19}$ to $_{23}$ will form a direct train of pulses (FIGS. 2e, f, g).

At a moment $t_1$, a control signal impressed on the revercible unit of the control device for a static converter opens via the commutation elements 5 the control circuit of the key thyristor 2 and closes the control circuit of the key thyristor 3. Meanwhile, the thyristor 3 is not energized as no control pulses appearing in the winding IX of the transformer 4, whereas the thyristor 2 remains energized and the control device continues to operate its direct count cycle to the end of the working cycle of the shift register (FIG. 2g). When the thyristor 11 is energized the transformer 37 is connected to the power supply source via: the + terminal of the power supply source, the thyristors 6 to II, the resistor 38, the primary winding of the transformer 37, the diode 39, the thyristor 2, the − terminal of the power supply source. A pulse originating in the winding XI of the transformer 37 upon the reversal magnetization of said transformer opens the transistor 36. The thyristors 6 and 2 are de-energized and the shift register is brought back to its initial position. The winding VII of the transformer 4 is then de-energized and the transformer 4 prepares for the next working cycle after having completed its reversal magnetization cycle under the influence of the e.m.f. of its windings XII connected in series with a coil 42 and a resistor 43 to the DC power supply source.

The next operating cycle of the device commences in a similar way when the thyristor 6 of the shift register is energized. The transformer 4 is then again connected to the power supply source via: the + terminal of the power supply source, the thyristor 6, the winding VII of the transformer 4, the resistor 41, the − terminal of the power supply source. A pulse originating upon the reversal magnetization of the transformer 4 in its windings VIII, IX is now applied only to the key thyristor 3 from the winding IX. The thyristor 3 is then energized and the reverse count windings I', II', III', IV', V', VI' of the output transformers are connected through the decoupling diodes 30, 31, 32, 33, 34, 35 and the key thyristor 3 to the − terminal of the power supply source. When the thyristors 6, 7, 8, 9, 10, 11 of the shift register are switched on output control pulses $U_{20}$, $U_{19}$, $U_{18}$, $U_{23}$, $U_{22}$, $U_{21}$ appearing in the windings X of the transformers 20, 19, 18, 23, 22, 21 upon the reversal magnetization cycle will form a train of pulses of a reverse sequence.

The shift register returns to its initial position in a way similar to that described above. Thus, irrespective of the moment of impressing the control signal upon the reversible unit, the control device for a static converter will effect its reverse cycle only after the termination of its direct cycle.

What is claimed is:

1. A control device for a reversible static frequency converter comprising a DC power supply source and, connected thereto, a master generator, a reversible unit including two key thyristors including electrodes and a push-pull shift register consisting of separate cells each comprising a control semiconductor switch including electrodes; output pulse transformers including direct and reverse count windings, resistors, decoupling diodes, a common point of ends of said windings of each transformer of two different cells being connected via said resistors to one of the electrodes of said semiconductor switch while the other ends of said windings are connected via said decoupling diodes to one of the electrodes of said key thristors; said reversible unit comprising commutation elements, circuits coupled to said commutation elements, a pulse transformer including a primary winding connected between said electrode of the semiconductor switch of the first cell of the shift register and the negative pole of said DC power supply source, the secondary windings being connected via said commutation elements to said circuits for operating two said key thyristors.

* * * * *